INVENTOR.
RICHARD J. BALAZER

July 26, 1966  R. J. BALAZER  3,262,680
MIXER FOR MIXING POTENTIALLY EXPLOSIVE MATERIALS
Filed Sept. 24, 1963  3 Sheets-Sheet 2

INVENTOR.
RICHARD J. BALAZER
BY
ATTORNEYS

United States Patent Office 3,262,680
Patented July 26, 1966

3,262,680
MIXER FOR MIXING POTENTIALLY
EXPLOSIVE MATERIALS
Richard J. Balazer, Saginaw, Mich., assignor to Baker
Perkins Inc., Saginaw, Mich., a corporation of New
York
Filed Sept. 24, 1963, Ser. No. 311,193
13 Claims. (Cl. 259—104)

This invention relates to mixer constructions and more particularly to mixers having bowls which are raised to immerse mixers extending from a mixer housing in the contents of the bowl. Such a mixer is shown and described in United States Patent No. 3,075,746, granted January 29, 1963, to Leon Yablonski and James W. Strouse, and is particularly useful for mixing highly reactive and potentially explosive materials such as high energy fuels. Since such fuels normally contain their own oxygen supply, they are ignited very easily and burn very rapidly. When mixing fuels of this type, safety requirements dictate that the bowls seal tightly to the mixer housing and that the mixing operation be performed at subatmospheric pressure in the absence of air. If the bowl can be quickly removed from the mixer housing, should the contents commence to burn, so that the pressure condition built up quickly by the burning fuel is relieved, an explosion which would otherwise damage the mixer, and the bowl lifting elements particularly, can usually be avoided.

One of the prime objects of the present invention is to provide sensing means for determining that a dangerous explosive condition exists during a mixing operation of the character described and for immediately disabling the mechanism holding the bowl to relieve the pressure condition which occurs and to provide access to the fuel.

A further object of the invention is to provide mechanism of the character described which is operable to decelerate and cushion the sharp downward movement of the bowl, once it has been moved from the immediate vicinity of the mixer housing.

A further object of the invention is to provide mechanism of the character described which may be incorporated in a mixer having leveling means for insuring that the bowl is moved upwardly to the mixer housing in a level condition.

Briefly, the invention is concerned with a mixer having a bowl which is raised to enclose the mixer members and sensing means which is responsive to a potentially explosive condition in the mixer to disable the means supporting the bowl in operative position so that the heavy bowl can quickly drop. The invention is also concerned with the manner in which the speed of descent of the bowl is decelerated after it has dropped a predetermined distance and the manner in which the bowl leveling means is incorporated so that it does not interfere with the rapid drop of the bowl, when a rapid drop becomes necessary.

A further object of the invention is to provide mechanism of the character described which is highly reliable and efficient in operation and relatively compact and simple in nature.

Still a further object of the invention is to define mechanism of the character described which can be easily and economically manufactured and applied to existing mixer installations, as well as to new installations.

Other objects and advantages of the invention will be pointed out specifically or will become apparent from the following description when it is considered in conjunction with the appended claims and the accompanying drawings, in which:

Figure 1:
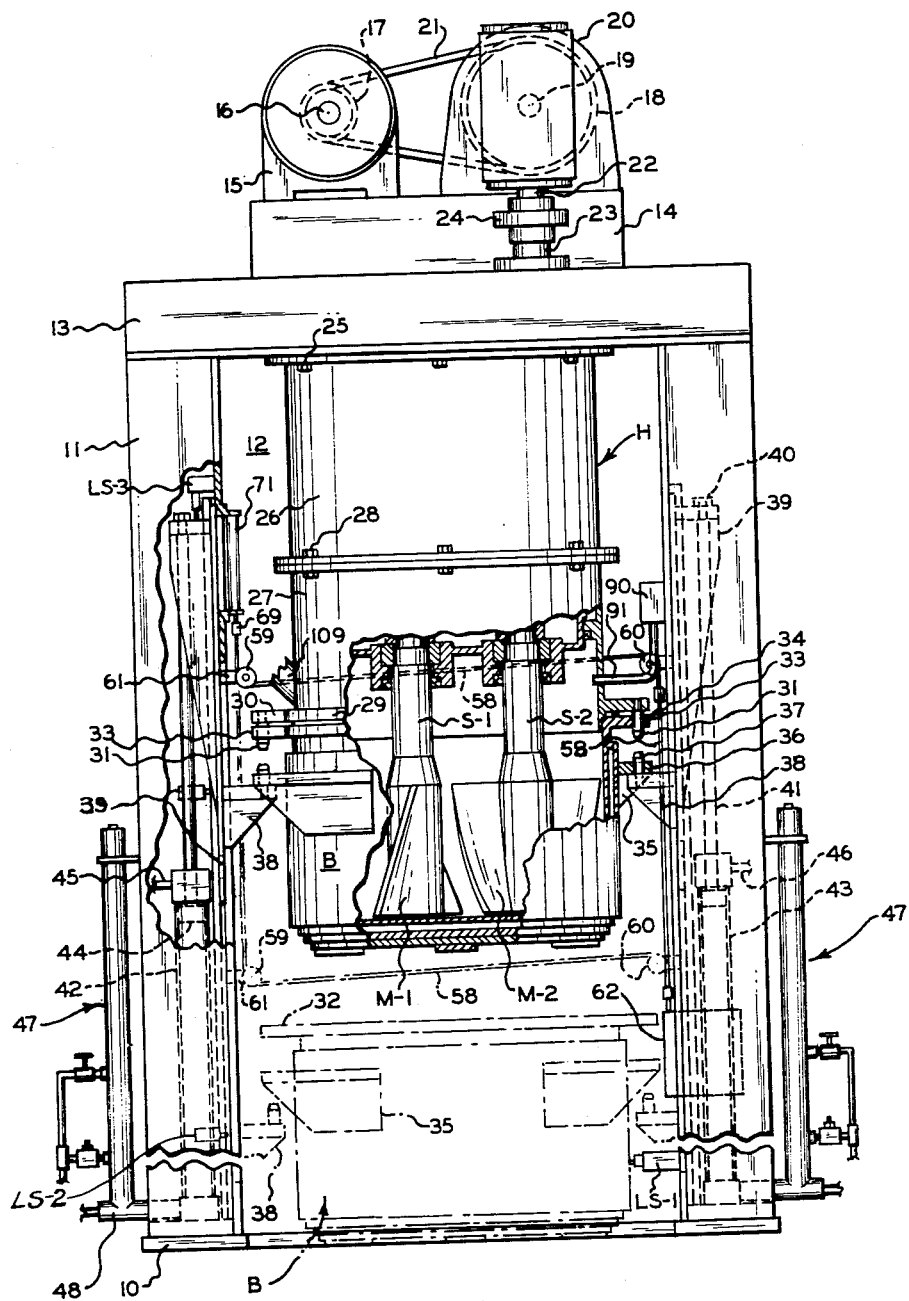
FIGURE 1 is a front elevational view of the mixing machine, with the diagrammatic lines indicating a lowered position of the bowl raising and lowering cylinders and bowl.

Referring now more particularly to the accompanying drawings, a mixing machine is depicted which, as in the aforementioned patent, has a base 10 supporting upright side wall casings 11, a rear wall casing 12, and a top wall casing 13. Provided on the top wall casing 13 on a platform 14 is a motor 15 having an armature shaft 16 mounting a drive pulley 17, as shown. The pulley 17 is connected to a pulley 18 mounted fast on the input shaft 19 of a speed reducer 20 through a belt 21, and the output shaft 22 of the speed reducer 20 is connected to a drive shaft 23 by a coupling 24. The drive shaft 23 may be connected with intermeshing mixer blade members M–1 and M–2 mounted on shafts S–1 and S–2 driven by the drive shaft 23 in exactly the manner shown in the aforementioned United States Patent No. 3,075,746.

A dependent tubular housing H is secured to the top casing 13 as with bolts 25 and comprises an upper shell 26 and a lower shell 27 which are bolted together as at 28. As in the aforementioned patent, the housing H is provided with a lower flange 29 having side ears 30 which mount depending locator pins 31. The front side of the mixer machine is open to permit a bowl B to be moved into position under the housing H and generally such a bowl B will be mounted on wheels and tracks will be provided leading in under the housing H. These elements form no part of the present invention and are not shown in FIGURE 1. A flange 32 is also provided on the upper end of the bowl B and is provided with ears 33 having openings 34 for receiving the locator pins 31 when the bowl B is raised upwardly to sealed engagement with the housing H in a manner which will be described. It is to be understood that the construction of the flanges 29 and 33 may be identical with the construction of the flanges of the mixer disclosed in the aforementioned patent, and that a seal is provided so that the bowl B seals to the lower end of the mixer housing H when it is brought up into engagement with it. The housing H is similarly a sealed housing, and is in sealed engagement with the top casing 13 in the manner illustrated in the patent to which I have referred.

Provided on the bowl B are brackets 35 having openings 36 to receive the locator pins 37 on lift arms 38. Each of the lift arms 38 is secured to a gusseted bracket 39 which is bolted as at 40 to the upper end of a piston 41. It will be noted that a double acting hydraulic cylinder 42 is provided on one side of the mixer and a like double acting hydraulic cylinder 43 is provided on the other side of the mixer, and each receives a piston rod 41 mounting a piston 44 on the lower end thereof. The line 45 for supplying oil under pressure to the cylinder 42 for forcing its piston 44 downwardly is shown at 45, and the line 46 for supplying oil to the cylinder 43 to force its piston 44 downwardly is similarly provided at the upper end of cylinder 43. The cylinders 42 and 43 may be conventional, double acting hydraulic cylinders of the type manufactured by Vickers Incorporated of Detroit, Michigan, U.S.A., Model No. FL–24–PS–20.

Figure 2:
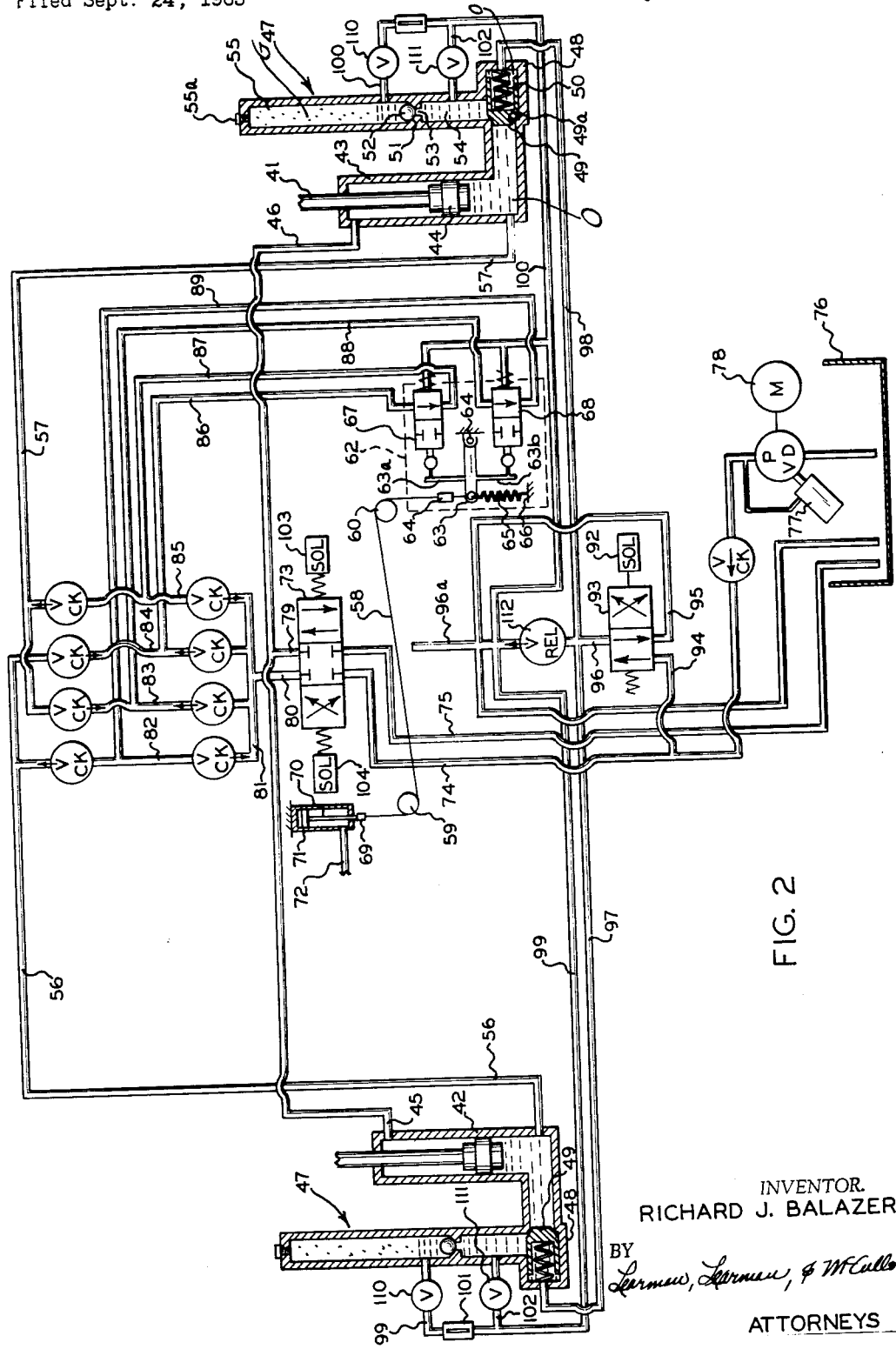
FIGURE 2 is a partly sectional, schematic, side elevational view illustrating the hydraulic system for operating the bowl raising and lowering mechanism.

At their lower ends each of the cylinders 42 and 43 connects with a vertical cylinder member generally designated 47 which is closed at its upper end. In FIGURE 1 a fitting 48 is illustrated which may be provided at the lower end of each cylindrical member 47 and, as shown schematically in FIGURE 2, housed within the fitting 48 is a tubular differential area, piston member 49 having a tapered nose portion 49a which in one position of piston member 49 seals the fitting as shown, a return spring 50 extending into each tubular piston 49 and bearing against the rear wall of the fitting 48 as shown. Intermediate its ends, each cylinder 47 is provided with a valve seat 51 for a ball check member 52 as shown, there being an opening 53 permitting the entry of fluid from the lower chamber 54 formed in each cylinder 47 to the upper chamber 55 formed therein as shown. Normally each chamber 54, the lower portion of each chamber 55, and each fitting 48 is filled with oil O. The springs 50 have little strength and the differential area between the front and rear surfaces of each piston 49 assures that each piston 49 is normally in the closed position in which it is shown in FIGURE 2, whether oil is being fed to the upper ends of the cylinders 42 and 43 through lines 45 and 46, respectively, or to the lower ends thereof through lines 56 and 57, respectively.

As will be presently explained, it is when the oil pressure behind pistons 49 is relieved and piston rods 41 are moved downwardly under the full weight of the bowl B that the pistons 49 are displaced and the oil in chambers 54 is forced upwardly to displace and compress the nitrogen gas G which is provided in the upper ends of cylinders 55 under a pressure of about 50 p.s.i. Valves 55a are provided in the upper ends of cylinders 47 to permit the nitrogen gas to be charged to cylinders 47 in the first place.

To maintain the bowl B level as it is being raised and lowered, a level adjustment system is provided which includes an elongate tape 58 (see FIGURES 1 and 2) trained around a pulley 59 supported by the piston rod of cylinder 42 and a pulley 60 supported by the piston rod of cylinder 43. The pulleys 59 and 60 may be supported by arms 61 which project inwardly from the brackets 38. At one side of the frame of the machine, mounted on a side casing 11, is a level adjusting valve box 62 in which is housed a lever 63 (see FIGURE 2) which is pivotally mounted within the box at 64. The lower end of tape 58 is secured to the lever 63 and it will be seen that the lever is connected to a coil spring 65 secured within the box 62 as at 66. A length adjusting member 64 is provided in the tape 58 so that adjustments in tape length are possible.

It will be seen that lever 63 includes a pair of arms 63a and 63b which operate normally open hydraulic valves 67 and 68, respectively. These valves may be the Model TT–2–160–O cam operated two way valves manufactured by Double A Products Co. of Manchester, Michigan, U.S.A. At its opposite end the tape 58 is coupled, as at 69, to the piston rod 70 of an air cylinder 71 which is at all times supplied with fluid under a predesignated pressure, such as 100 p.s.i., through a line 72. The significance of connecting the end of the tape 58 to the piston 70 will later be explained.

Normal raising and lowering of the pistons 41 to raise and lower the bowl B is accomplished through a normally neutral four way, double solenoid hydraulic valve 73 which may be a Model XDG4S4–012C–41 valve manufactured by Vickers Incorporated. Lines 74 and 75 normally connect the valve 73 with a pump P and a reservoir 76, respectively. The pump P is one having a pressure control 77 and may be the variable volume pump which is included in the Vickers hydraulic power package Model T20–B10C–6–10 manufactured by Vickers Incorporated which includes an electric motor 78. From the valve 73 a line 79 leads to the lines 45 and 46, and a line 80 leads to a manifold line 81 to which lines 82–85 connect. It will be seen that each of the lines 82 and 84 connect with the line 56, and each of the lines 83 and 85 connect with the line 57. In addition, a line 86 leading to the valve 67 connects with the line 84, and a line 87 leading from the valve 67 connects with the line 85. Also, a line 88 leading to the valve 68 connects with the line 83, and a line 89 leading from the valve 68 connects with the line 82. It will be seen that pairs of ball check valves are provided in the lines 82–85 (the arrows pointing in the direction in which flow is permitted) which insure that all fluid proceeding to the lower ends of cylinders 42 and 43 proceeds first of all to the valves 67 and 68.

Mounted on the one side casing 11, as shown in FIGURE 1, is a normally closed electro-pneumatic pressure responsive switch 90, which may be a Model DIX–H18–SS manufactured by Barksdale Valves, of Los Angeles, California, U.S.A. The switch 90, which may be set to open under a pressure of 1 p.s.i. above atmospheric pressure, communicates with the interior of housing H through a line 91, and when the pressure build-up in housing H indicates that the fuel being mixed is burning, the normally energized solenoid 92 of a hydraulic valve 93, which may be the Model XDG4S4–012A–41 valve manufactured by Vickers Incorporated is deenergized and the hydraulic system permits the bowl B to drop sharply away from the housing H in a manner which will be shortly described in detail. A line 94 connects with the valve 93 to divert oil thereto from the line 74 communicating with pump P, and a line 95 leads from valve 93 to the reservoir 76. Leading from the valve 93 is a pipe 96 connecting with a line 97 communicating with the fitting 48 adjacent to cylinder 42, and a line 98 leading to the fitting 48 adjacent to cylinder 43. The line 96 is connected to a standpipe 96a by a safety valve which opens only when normal operating pressure is exceeded in the lines 97 and 98 and it will be seen that line 95 connects with the standpipe 96a. Also communicating with the pipe 96a is a line 99 which leads to the upper end of the cylinder 47 connected with hydraulic cylinder 42 and a line 100 which leads from the standpipe 96a to communicate with the chamber 55 of the cylinder 47 connecting with cylinder 43. Sight gauges 101 may be provided in each of the lines 99 and 100, and branch lines 102 connect each of the lines 99 and 100 with the chambers 54 of the cylinders 47.

Figure 3:
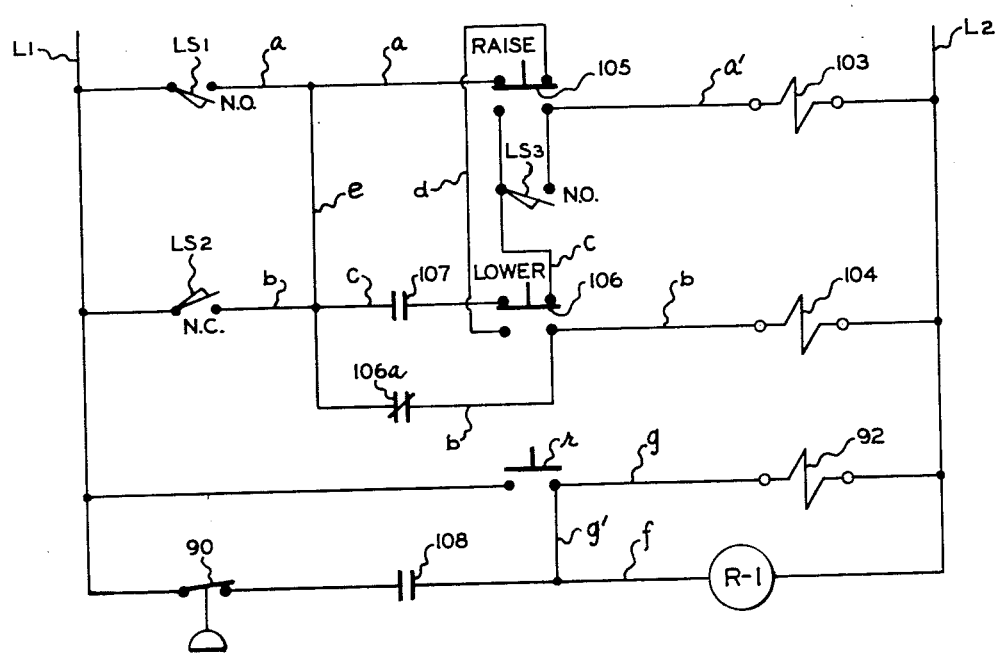
FIGURE 3 shows a typical electrical circuit for controlling the hydraulic system operating the bowl raising and lowering elements.

In FIGURE 3 I have shown a wiring diagram which comprises line wires L–1 and L–2 connected with a suitable source of current. A limited switch LS–1 is provided in a circuit line $a$ and a circuit line $a'$ includes the raise solenoid 103 of the normally neutral valve 73. A normally closed limit switch LS–2 is provided in a circuit line $b$ spanning the line wires L–1 and L–2 which also includes the lowering solenoid 104 of valve 73. As shown in FIGURE 1, normally open limit switch LS–1 is closed when the bowl B is placed in position under the mixer, and normally closed limit switch LS–2, which is held open by the one slide 39 when the slide is in "down" position, closes when the slides or brackets 39 are raised enough to release it. This occurs at the time the locating pins 37 are received in the locator openings 36. A third normally open limit switch LS–3 is provided in a line $c$ which may bridge lines $c$ and $a'$. In addition, a push button 105 which normally connects the circuit $a$ with a line $d$, as shown in FIGURE 3, is provided, and a push button 106 which normally bridges the circuit line $c$ is also provided. The button 105 may be actuated to connect the circuit lines $c$ and $a'$, and the button 106 may be actuated to connect the circuit lines $d$ and $b$. A circuit line $e$ bridges the lines $a$ and $b$. In addition, the relay R-1 which is connected in the circuit line *f* has normally closed contacts 106*a* in the line *b*, and normally open contacts 107 and 108 in the lines *c* and *f*. The normally closed pressure switch 90 is connected in the circuit line *f* with the normally open contacts 108 of the relay R-1. A reset button *r* is provided, as shown, in the line *g* which also includes the solenoid 92 of valve 73, and a line *g'* connects the lines *g* and *f*. Limit switch LS-3 closes just before the bowl B reaches its upper mixing position to keep the raise solenoid 103 energized during the mixing operation.

*The operation*

In operation, when a bowl B containing contents to be mixed is transported to the position indicated in diagrammatic lines in FIGURE 1 under the housing H, the normally open limit switch LS-1 is closed. At this time, limit switch LS-2 is held open by the one slide 39 which is in "down" position. Also, the coil of relay R-1 holds the contacts 107 and 108 closed and the contacts 106 open. If the operator then depresses the "raise" button 105 to bridge the circuit lines *c* and *a'*, the raising solenoid 103 is energized through lines *a*, *e*, *c*, and *a'* and valve 73 is actuated to provide flow from the line 74 to the line 80 and through the valves 68 and 67 to the lines 56 and 57, respectively, which supply the lower ends of cylinders 42 and 43, so that the piston rods 41 are raised. At this time the lines 45 and 46 leading from the upper ends of cylinders 42 and 43 are connected with the line 75 leading to the reservoir 76 through the valve 73 in line 79.

When the left (in FIGURE 1) slide or bracket 39 is raised sufficiently, it moves beyond the normally closed limit switch LS-2 which closes and functions to supply current to the solenoid 103 through circuit lines *b*, *c*, and the button 105 which is held in depressed position. Limit switch LS-2 is so positioned that this occurs at the time the pins 37 are received by the openings 36. Thus the limit switch LS-2 takes over the function of the limit switch LS-1 which opens when the bowl B passes beyond it. Normally open limit switch LS-3 is closed by the left slide or bracket 39 in FIGURE 1 just before the bowl reaches the mixing position in which it is shown in solid lines in FIGURE 1 and functions to keep the raise solenoid 103 energized during the mixing operation through lines *b*, *c*, and *a'*, even though the button 105 is released. During the mixing operation the pump P with its pressure control 77 maintains a constant pressure under the pistons 44 adequate to support the weight of the bowl and its contents. For example, the pump may have to maintain 750 p.s.i. to accomplish this purpose.

During the time that the bowl B is being raised, the pulleys 59 and 60 are being moved upwardly by the slides or brackets 39, and if the bowl B should tilt, the leveling adjustment system 62 will be actuated to compensate for the lead or lag of one of the cylinders 42 and 43. If, for instance, cylinder 43 is leading, the lever 63 will be pivoted clockwisely by the tape 58 to actuate valve 67 to partially close off the flow from line 86 through the valve 67 to the line 87 and thereby restrict the flow to line 57. Similarly, if the cylinder 42 should lead the cylinder 43, the lever 63 is pivoted counterclockwisely and the valve 68 is partly closed to restrict the flow of fluid from line 88 through the valve 68 to the line 89 and thereby restrict the flow to line 56.

The interior of the housing H is preferably evacuated through a line connection such as at 109 to a suitable vacuum pump. If the mixing of the contents of bowl B proceeds normally, the vacuum condition in housing H is maintianed and the pressure switch 90 remains closed. The valve 93 which is actuated by the normally energized solenoid 92 normally connects the line 94 with the lines 97 and 98 and normally maintains the valve pistons 49 in the closed positions in which they are shown in FIGURE 2. To lower the bowl B after a normal mixing operation, the button 106 is depressed to connect circuit lines *d* and *b* and energize lowering solenoid 104. Depressing the button 106 energizes solenoid 104 through lines *b*, *e*, *a*, *d*, and the button 106. The bowl B descends evenly since the level adjustment system 62, in the same manner as previously, takes care of the lead or lag of one of the cylinders 42 and 43.

If the contents of the bowl B should commence to burn during the mixing operation, pressure will build up in the housing H and the pressure switch 90 is opened. Solenoid 92 and relay R-1 are deenergized and valve 93 is spring returned to deactivated position. This has the effect of communicating the lines 97 and 98 with the line 95 leading to the reservoir 76 and relieving the pressure behind valve pistons 49. During the mixing operation the solenoid 103 remains energized, as noted, with a circuit being made through lines *b*, *c* and LS-3. Deenergization of the relay R-1 permits contacts 107 to open and contacts 106*a* to close to deenergize this circuit and energizes a circuit to solenoid 104 through line *b*. The bowl B will drop sharply because, with the pressure relieved behind valve piston 49, oil will be forced past the piston 49 to the chambers 54 as well as into lines 56 and 57. While the bowl B first free falls rapidly as the oil is displaced into chambers 54, which are enlarged by the retreat of valve pistons 49, the nitrogen gas in chambers 55 is, after an interval, compressed by the oil and the fall of the bowl is then cushioned to its normal lowering speed. The switch 90 then both reverses the valve 73 to its lowering position and operates valve 93 to relieve the pressure behind valve pistons 49. In this way an explosion is avoided which would otherwise damage at least the cylinders 42 and 43.

As noted, a pressure of about 100 p.s.i. is maintained in the cylinder 71 and the piston 70 gives as soon as the tape 58 is pulled more than is required to completely depress the leveling valve 67. No attempt is made to control the level of the rapidly dropping bowl and it is necessary to connect the tape in this manner to prevent damage to the level adjusting system. When it is desired to operate the mixer again, manually actuated draining valves 110 are operated to return the displaced oil to the system and the reset button *r* can be depressed to again energize solenoid 92 and restore the valve 93 to its actuated position. Relay R-1 will also be energized, of course, to close contacts 107 and 108 and open contacts 106*a*. Returning of the valve 93 to operating position has the effect of opening the flow of oil through the line 94 to the lines 97 and 98 to restore the oil pressure behind valve pistons 49 and permit normal operation of the mixing machine once again.

Various other conventional valves are provided in the system as shown. For instance, the valves 111 are leakage drain valves which are barely cracked open. The valve 112 is a safety relief valve which may be set to open at 850 p.s.i. when normal line pressure is 750 p.s.i. and thus have no effect on normal machine operation. However, if pressure switch 90 or valve 93 should fail or delay in operating during an explosion, valve 112 allows pistons 49 to rapidly pass oil to chambers 54 at pressures well within the strength of the machine. Also, it will be noted that the system is fail safe in the sense that the control circuit is broken when the pressure switch 90 is actuated. Deenergization of the control circuit, as when a power failure occurs, will itself cause safety dropping of the bowl B. With the system described, provision is made for efficiently and reliabity taking care of emergency situations without rendering the system inoperative.

While I have shown a pressure responsive switch 90 for triggering the release of the bowl B, I contemplate that other devices may be used. For instance, a flame detection device responsive to an orange color or a heat detection device in the form of a dissimilar metal thermostat or a Bourdon tube could be employed within the housing H to actuate a switch. The pressure switch shown is preferred because of its low cost and the fact that it will detect burning at the bottom of the bowl very rapidly before, for instance, the flame is visible to a flame detecting device.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. In a mixer; axially disposed mixer means including mixer element means and bowl means movable relatively axially from a remote position to an operative position in which said bowl means encloses said mixer element means; a motor effecting said axial movement and also exerting an axial force holding said bowl means and mixer means in operative position; and means responsive to an abnormal condition in said bowl means for disabling said motor to permit rapid return to the remote position.

2. In a mixer; an axially disposed mixer housing mounting mixer means; bowl means movable axially from a remote position to an operative position surrounding said mixer means; fluid pressure supplied means at each side of said bowl means for moving said bowl means to operating position; means for supplying fluid under pressure thereto; means for relatively moving said mixer means and bowl means to mix the contents of said bowl means; means permitting said bowl means to move at a high rate of speed away from said housing in the event of an abnormal mixing condition; leveling adjustment means including a control member movable when one of said fluid pressure supplied means leads or lags the other fluid pressure supplied means; fluid pressure flow control means interposed between said means for supplying fluid under pressure and said fluid pressure supplied means and connected to said control member to be actuated thereby; and means supporting said control member yieldable when said bowl means moves at a high rate of speed to prevent damage to said leveling adjustment means.

3. The combination defined in claim 2 in which said fluid pressure supplied means at each side of said bowl means comprises fluid pressure actuated cylinders having piston rods mounting bowl raising slides; said control member comprises an elongate flexible strip connected at one end to said flow control means and at the other to said means yieldably supporting said strip; and guides mounted on said slides around which said strip is trained to respond to relative lead or lag of said slides.

4. The combination defined in claim 3 in which said yieldable supporting means for said flexible strip comprises an air cylinder having a piston rod to which said strip is connected.

5. In a mixer; a mixer housing having vertically extending mixer means; bowl means for sealing to said mixer means movable vertically from a position remote from said mixer housing up into engagement with said mixer housing; means for relatively moving said mixer means and bowl means to mix the contents of the bowl means; fluid pressure means for moving said bowl means upwardly into engagement with said housing means; means responsive to an increased pressure in said mixer housing disabling said fluid pressure means and permitting said bowl means to drop under the influence of gravity; and means incorporated with said fluid pressure means for cushioning the fall of said bowl means after a predetermined interval of drop.

6. In a mixer for combustible materials; axially disposed mixer housing means including mixer means and bowl means movable relatively axially from a remote position to an operative position in which said mixer means is enclosed by said bowl means; means holding said bowl means in operative position; and means, sensing that the contents of the bowl means are burning, reactive to disable said holding means to permit return to said remote position.

7. In a mixer for combustible materials; an axially disposed mixer housing having vertically extending mixer means; bowl means for sealing to said mixer means movable vertically from a position remote from said mixer housing into engagement with said mixer housing; fluid pressure operated cylinder means including piston rod means mounting lift arm means for raising and lowering said bowl means; a source of fluid under pressure and fluid circuit means connecting said source with the cylinder means; electrical circuitry connectable to a source of power and fluid circuit elements actuated thereby to move fluid from said source, under pressure, to the lower and upper end of said cylinder means for raising and lowering said lift arm means and bowl means; auxiliary cylinder means connected with the lower end of said cylinder means; valve means in said auxiliary cylinder means for discommunicating said cylinder means from the auxiliary cylinder means; line means connected with the source of fluid under pressure communicating with said valve means and imposing a fluid pressure on said valve means urging it to a position normally preventing communication of said auxiliary cylinder means with said cylinder means during raising and lowering of said bowl means; means for revolving said mixer means to mix the contents of the bowl means; means for maintaining fluid under pressure in the cylinder means to hold said bowl means in raised position in engagement with said housing means during the mixing operation, and means connected in said circuitry responding to a burning condition in said mixer housing to relieve the fluid pressure on said valve means and permit its displacement to allow fluid from the cylinder means to enter the auxiliary cylinder means and permit said bowl means to drop sharply under the influence of gravity.

8. The combination defined in claim 7 in which said cylinder means comprises a pair of hydraulic cylinders.

9. The combination defined in claim 7 in which said auxiliary cylinder means includes gas filled chamber means closed by check valve means.

10. The combination defined in claim 7 in which said means responsive to a burning condition comprises a pressure switch and means is provided for moving fluid under pressure to the upper end of said cylinder means when said pressure switch is actuated.

11. The combination defined in claim 10 in which said pressure switch has normally closed contacts connected in said electrical circuitry.

12. In a mixer; an axially disposed mixer housing having vertically extending mixer means; bowl means for sealing to said mixer means movable vertically from a position remote from said mixer housing into engagement with said mixer housing; a pair of hydraulic cylinder means provided with lift arms for raising and lowering said bowl means; a source of fluid under pressure and means connecting said source with the cylinder means; electrical circuitry connectable to a source of power including elements actuatable to initiate said raising and lowering operations; pulleys on said lift arms; a tape trained around said pulleys; flow restricting valve means connected to one end of said tape and interposed between said source and cylinder means to vary the flow to said cylinder means in accordance with the relative lag or lead thereof as indicated by said tape; a fixed air cylinder having a piston rod to which the other end of said tape is connected; means for revolving said mixer means to mix the contents of the bowl means; means incorporated with said means connecting said source and cylinder means operating said cylinder means to hold said bowl means in engagement with said housing means during the mixing operation; and means responsive to an increased pressure in said mixer housing disabling said cylinder means to permit said bowl means to drop sharply under the influence of gravity.

13. In a mixer for combustible materials; mixer housing means including mixer element means and a closure for said housing means movable from a remote position to a closed position; means holding said closure in closed position; and means, sensing that the material being mixed is burning. reactive to disable said holding means and permit said closure to return to remote position.

References Cited by the Examiner

UNITED STATES PATENTS

| 2,086,266 | 7/1937 | Heue et al. | 99—238 |
| 3,075,746 | 1/1963 | Yablonski et al. | 259—102 |

WILLIAM I. PRICE, *Primary Examiner.*

WALTER A. SCHEEL, *Examiner.*

ROBERT W. JENKINS, *Assistant Examiner.*